United States Patent Office 3,453,410
Patented July 1, 1969

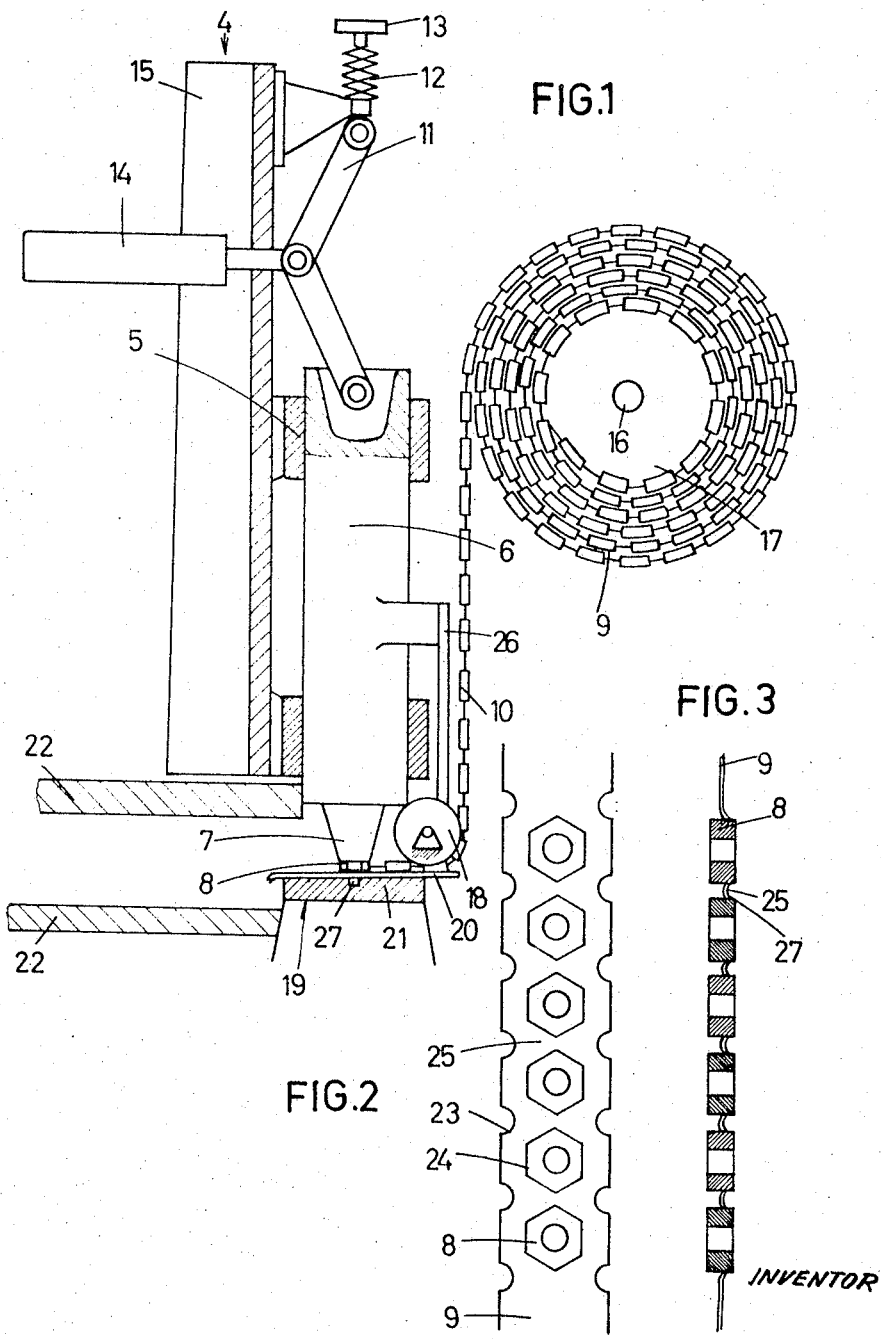

3,453,410
AUTOMATIC WELDING MACHINE FOR MASS PRODUCED ARTICLES
Fritz Amann, Rothenburg ob der Tauber, Germany, assignor to Titan Eisenwarenfabrik GmbH, Schweln, Westphalia, Germany
Filed Apr. 20, 1966, Ser. No. 543,827
Claims priority, application Germany, Apr. 20, 1965, A 48,978
Int. Cl. B23k 11/02; B65h 5/28; G07f 11/68
U.S. Cl. 219—103                  5 Claims

ABSTRACT OF THE DISCLOSURE

A welding machine for welding small articles such as nuts to workpieces in which a band carrying the articles at closely spaced portions thereof is stepwise moved through the gap between a pair of electrodes in sequence with the movement of the electrodes toward each other. The band includes apertures separated by bowed webs which allow the nuts to be held resiliently.

---

The invention relates to an automatic welding machine for mass produced articles, preferably welding nuts which are to be welded to some structural member but the invention is also applicable to small stamped parts, eyelets and the like.

According to the invention, the articles to be welded are applied to or inserted in emplacements on or in elongated mounting means. However, the invention also extends to means such as a strip for use in welding machines.

By means of the invention a convenient support is provided for the nuts or other articles and, in the case where the emplacements are holes in a strip, the material separating the holes may form spring-like webs which clamp the articles during transport and during welding. The strip may be made of any suitable material such as very thin sheet metal and provision may be made for guiding the strip to the operative position by means of drive wheels or rollers and direction-changing wheels or rollers which preferably engage the edges of the strip and advance the later in synchronism with the operating cycle of the machine. This is important because the primary application of the present invention is intended to be in automobile factories where the feed of the strip can be coupled to the conventional assembly line. When working with assembly lines, it is important that the nuts to be welded always arrive at one and the same predetermined position at exactly the same time so as to be welded in this position.

An example of the invention is illustrated in the accompanying diagrammatic drawings wherein:

FIG. 1 is a part-sectional elevation of an automatic rolling machine;

FIG. 2 is an enlarged plan view of the mounting strip used in the machine of FIG. 1, and FIG. 3 is a side elevation of the mounting strip according to FIG. 2.

FIG. 1 shows only those parts of the welding machine 4 that are necessary for an understanding of the present invention. The machine performs resistance welding, especially spot welding, and is provided with a guide 5 for an operating cylinder 6 and an upper electrode 7 which serves to weld mass produced articles such as the welding nuts 8 to structural members, one of which is shown at 20. The nuts 8 are carried on a sheet metal strip 9 by being pressed into emplacements 10. The necessary welding pressure is produced by a bell crank 11 and the pressure is adjustable by means of a hand wheel 13 which acts on a set of plate springs 12. The bell crank 11 is operated by a pressure cylinder 14 which is carried on a frame member 15 which may be of U-section.

The strip 9, together with the articles 8 applied thereto, are coiled on a mandrel 16 of a cassette 17 and is led to the operative position under the electrode 7 by a direction-changing drive wheel 18 so that the articles 8 reach a horizontal table 19 for the structural member 20 which rests on a lower electrode 21. Each electrode 7 and 21 is provided with an electric conductor 22 leading from a welding transformer (not shown).

As shown in FIG. 2, the longitudinal edges of the strip 9 are perforated in conformity with the drive wheel 18 and provided with recesses 23. The articles 8 are received in apertures 24 which are aligned along the centre line of the strip 9. The apertures 24 have an outline corresponding to the articles 8 which are clamped at the edges bounding the apertures 24. The material remaining between the apertures 24 constitute webs 25 which have a spring effect to clamp the articles 8 so that the latter cannot drop out during transport or welding.

The drive wheel 18 engages in the recesses 23 of the strip 9 and is operated by a latch 26 or the like so that the strip is advanced progressively. The latch 26 is mounted parallel to the operating cylinder 6 and at a spacing therefrom whilst the drive wheel 18 is in a fixed position.

FIG. 3 shows how the webs 25 are bowed at the edges 28 of the apertures receiving the articles 8. Such bowing is occasioned by pressing the articles 8 into the apertures 24 and enhances the grip on the sides of the articles 8. As shown in FIG. 2, the recesses 23 are substantially aligned with the webs 25.

Referring to FIG. 1, the coil of strip 9 has been placed over the mandrel or shaft 16 and the leading end of the strip is in engagement with the drive wheel 18 which can be in the form of a gear or sprocket or, if there are no recesses 23 in the strip, in the form of a friction wheel. The electrode 7 is provided with a centering or locating pin 27 on which the first article 8 is seated and the machine is shown in the operating position.

Welding is conducted in the conventional manner in that pressure is applied to the cylinder 6 so as to actuate the latter, whereby the electrode 7 is applied with the required pressure to the electrode 21 and the article 8 becomes welded to the structural member 20 located between the electrodes.

As the operating cylinder 6 is lifted to return to an inoperative position, the latch 26 moves the wheel 18 in a clockwise direction whereby the strip 9 is advanced until the next article 8 is located in position under the electrode 7.

The locating pin 27 can cater for any slight inaccuracies by correctly positioning the article 8 in the welding position. Provision may also be made for preventing the strip 9 from sagging and thereby slipping from the locating pin 27, for example by means of providing an extraction tool with a magnet or suitably guiding the end of the strip 9.

Instead of the illustrated strip 9, the mounting means may be in the form of relatively thin wire which is shaped to embrace the articles 8.

I claim:
1. An automatic welding machine for welding small articles, especially nuts, to a workpiece comprising, in combination, a pair of spaced welding electrodes defining between opposite ends thereof a gap adapted to receive a workpiece and an article to be welded thereto; moving means operatively connected to at least one of said electrodes for moving the latter towards the other electrode to press an article and a workpiece located in said gap against each other; and means for automatically feeding the articles into said gap in synchronization with said moving means and comprising a band for carrying said articles at portions closely spaced in longitudinal direction of said band from each other and being at least partly resilient so as to resiliently engage said articles and means operated by said moving means for stepwise moving said band in spnchronization with the movement of said one electrode.

2. A welding machine as defined in claim 1, wherein said portions of said band are formed with apertures in which said articles respectively extend, at least some edge portions of said band defining said apertures are bent to resiliently engage the articles located in said apertures.

3. A welding machine as defined in claim 1, wherein longitudinal outer edges of said band are formed between said apertures with cutouts extending from the respective outer edge into the band for engagement with said means for stepwise moving said band.

4. A welding machine as defined in claim 1, wherein said band is a thin band which is expendable after transporting the articles through the gap.

5. A welding machine as defined in claim 1, wherein said moving means comprise a toggle lever connected at one end to said one electrode and fluid operated cylinder and piston means connected to said toggle lever.

References Cited

UNITED STATES PATENTS

| | | | |
|---|---|---|---|
| 1,697,306 | 1/1929 | Cutler | 221—78 |
| 3,123,703 | 3/1964 | Loeper | 219—103 |
| 3,312,810 | 4/1967 | Neumeier | 219—103 |
| 3,327,089 | 6/1967 | Napoli | 219—98 |

ANTHONY BARTIS, *Primary Examiner.*

C. CHADD, *Assistant Examiner.*

U.S. Cl. X.R.

221—72